(12) United States Patent
Bedell et al.

(10) Patent No.: US 7,612,964 B2
(45) Date of Patent: Nov. 3, 2009

(54) MAGNETIC WRITE HEAD HAVING A SELF ALIGNED, STEEP SHOULDER POLE STRUCTURE AND METHOD OF MANUFACTURE THEREOF

(75) Inventors: Daniel Wayne Bedell, Gilroy, CA (US); Hieu Lam, Milpitas, CA (US); Kim Y. Lee, Fremont, CA (US); Jyh-Shuey Lo, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 689 days.

(21) Appl. No.: 11/228,783

(22) Filed: Sep. 15, 2005

(65) Prior Publication Data
US 2007/0058293 A1    Mar. 15, 2007

(51) Int. Cl.
*G11B 5/187* (2006.01)
(52) U.S. Cl. .............................. 360/125.51; 360/125.52; 360/125.53
(58) Field of Classification Search ............ 360/125.19, 360/125.51, 125.52, 125.53
See application file for complete search history.

(56) References Cited

U.S. PATENT DOCUMENTS

| | | | |
|---|---|---|---|
| 5,804,085 A | 9/1998 | Wu et al. ....................... 216/22 |
| 6,141,183 A | 10/2000 | Wu et al. ..................... 360/126 |
| 6,141,857 A | 11/2000 | Furusawa et al. ............. 29/603 |
| 6,243,939 B1 | 6/2001 | Chen et al. ............... 29/603.14 |
| 6,261,468 B1 | 7/2001 | Sato et al. ...................... 216/22 |
| 6,270,929 B1 | 8/2001 | Lyons et al. .................... 430/5 |
| 6,339,872 B1 | 1/2002 | Chang et al. ............. 29/603.14 |
| 6,393,692 B1 | 5/2002 | Ju et al. .................... 29/603.14 |
| 6,487,041 B2 * | 11/2002 | Yamanaka et al. ...... 360/125.43 |
| 6,510,024 B2 | 1/2003 | Otsuka et al. ................ 360/126 |
| 6,526,649 B2 | 3/2003 | Ohkawara ................ 29/603.07 |
| 6,553,649 B1 | 4/2003 | Santini ..................... 29/603.14 |
| 6,557,242 B1 | 5/2003 | Santini ..................... 29/603.14 |
| 6,577,475 B1 * | 6/2003 | Sasaki et al. ................. 360/317 |
| 6,642,148 B1 | 11/2003 | Ghandehari et al. ......... 438/694 |
| 6,650,502 B2 * | 11/2003 | Yazawa et al. ......... 360/125.51 |
| 6,683,749 B2 * | 1/2004 | Daby et al. ............. 360/125.51 |
| 6,687,096 B2 * | 2/2004 | Sasaki et al. ................. 360/317 |
| 6,738,232 B1 | 5/2004 | Sasaki ......................... 360/317 |
| 6,743,712 B2 | 6/2004 | Park et al. .................... 438/637 |
| 6,947,255 B2 * | 9/2005 | Hsiao et al. ............ 360/125.51 |
| 7,042,677 B2 * | 5/2006 | Ohtomo et al. ........ 360/125.51 |
| 7,060,207 B2 * | 6/2006 | Sasaki et al. ........... 360/125.51 |
| 2002/0167759 A1 * | 11/2002 | Sato et al. .................... 360/126 |
| 2002/0178573 A1 | 12/2002 | Oike et al. ................ 29/603.15 |
| 2003/0021064 A1 * | 1/2003 | Ohtomo et al. .............. 360/126 |

* cited by examiner

*Primary Examiner*—Jefferson Evans
(74) *Attorney, Agent, or Firm*—Zilka-Kotab, PC

(57) ABSTRACT

A magnetic write head and method of manufacture thereof that has a first pole structure having a notched structure configured with a steep shoulder portion and a narrow vertical notch portion extending from the top of the steep shoulder portion. The write head also includes a second pole structure (P2) that has a very narrow width (track width) and that is self aligned with the narrow vertical notch structure of the first pole structure. The write head provides excellent magnetic properties including a very narrow track width and minimal side writing, while avoiding magnetic saturation of the poles.

11 Claims, 21 Drawing Sheets

MAGNETIC WRITE HEAD HAVING A SELF ALIGNED, STEEP SHOULDER POLE STRUCTURE AND METHOD OF MANUFACTURE THEREOF

FIELD OF THE INVENTION

The present invention relates to magnetic write heads for magnetic data recording, and more particularly to a magnetic write head having a narrow P2 write pole that is self aligned with a P1 write pole having a steep shoulder for reduced flux leakage.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but is free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

The magnetic signals are written to the magnetic medium by a write head that includes an electrically conductive write coil that passes between first and second poles. The poles are joined at a back gap region and separated from one another by a write gap in a pole tip region near the ABS. When a current passes through the coil, a resulting magnetic flux in the magnetic yoke generated a fringing magnetic field that extends between the pole tips fringes out to write a magnetic signal onto an adjacent magnetic medium.

The configuration of the magnetic poles in the pole tip region of the write head is very important to the magnetic performance. For example, the pole tips must have sufficient area to avoid choking off the flow of magnetic flux to the pole tip or saturating the pole tips. Also, since the width of the pole tips defines the track width of the write head, at least one of the poles must have a width that is sufficiently narrow to define a desired narrow track width. A smaller track width means that more tracks of data can be written onto a given amount of disk space. The write element should also be constructed to prevent undesired, stray magnetic fields, such as those that can contribute to adjacent track writing. For example, fields that extend laterally from the sides of the pole tips rather than straight from one pole to the other can result in a signal being bleeding to an adjacent track and can interfere with the signal of that adjacent track.

However, constructing a write head to have these desired characteristics has been limited by currently available manufacturing methods. For example, the resolution limitations of currently available photolithographic processes, and the ability to align multiple photolithographically defined mask structures limits the amount to which the track width of the pole tips can be reduced.

Therefore, there is a strong felt need for a write head structure that can define a very narrow track width, with sufficiently strong field strength and with minimal side writing. Such a write head must be constructed by a method that allows proper alignment and symmetry between and within each of the pole tips.

SUMMARY OF THE INVENTION

The present invention provides a write head having a first magnetic pole with a steep shouldered notch structure. The write head includes a narrow second pole structure P2 that is self aligned with the steep shouldered notch structure of the first magnetic pole.

The first pole may include a narrow vertical notch structure that extends from the top of the steep shoulder portions and which is self aligned with the second pole structure. The steep shouldered first pole structure of the present invention advantageously minimizes side writing while also avoiding saturation of the pole.

The write head of the present invention may include a second pole structure that defines a very narrow track width, and that is advantageously self aligned with the notch structure of the first pole structure.

A method for manufacturing a write head according to the present invention includes forming the first magnetic pole layer, depositing a non-magnetic write gap and then forming a mask such as a photoresist frame. The mask has an opening with a first width W1 into which a first magnetic layer can be deposited (P21). After depositing this first magnetic layer into the mask opening, a layer of shrinkable material, such as for example SAFIER® is deposited into the opening.

A shrinking process, such as baking at about 120 degrees C. can then be performed to shrink the opening of the mask (photoresist frame) to a smaller width W2. A second magnetic layer (P2) can then be deposited into the opening in the mask at this smaller width. This allows the second magnetic layer (P2 layer) to be smaller than the first magnetic layer (P21) while being perfectly centered over the P21 layer. Furthermore, and very importantly, the P2 layer can be perfectly centered over the P21 layer without the need to align a second photoresist mask with the structure formed by the first photoresist mask.

The mask and shrinkable material can then be removed and a material removal process such as ion milling can be performed to remove selected portions of the first pole layer using the P21 and P2 structures as masks. The perfect alignment (centering) of the P2 layer over the P21 layer advantageously ensures that the steep shoulders formed during the ion milling operation will have perfectly symmetrical slopes, thereby ensuring optimal magnetic performance of the write head.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
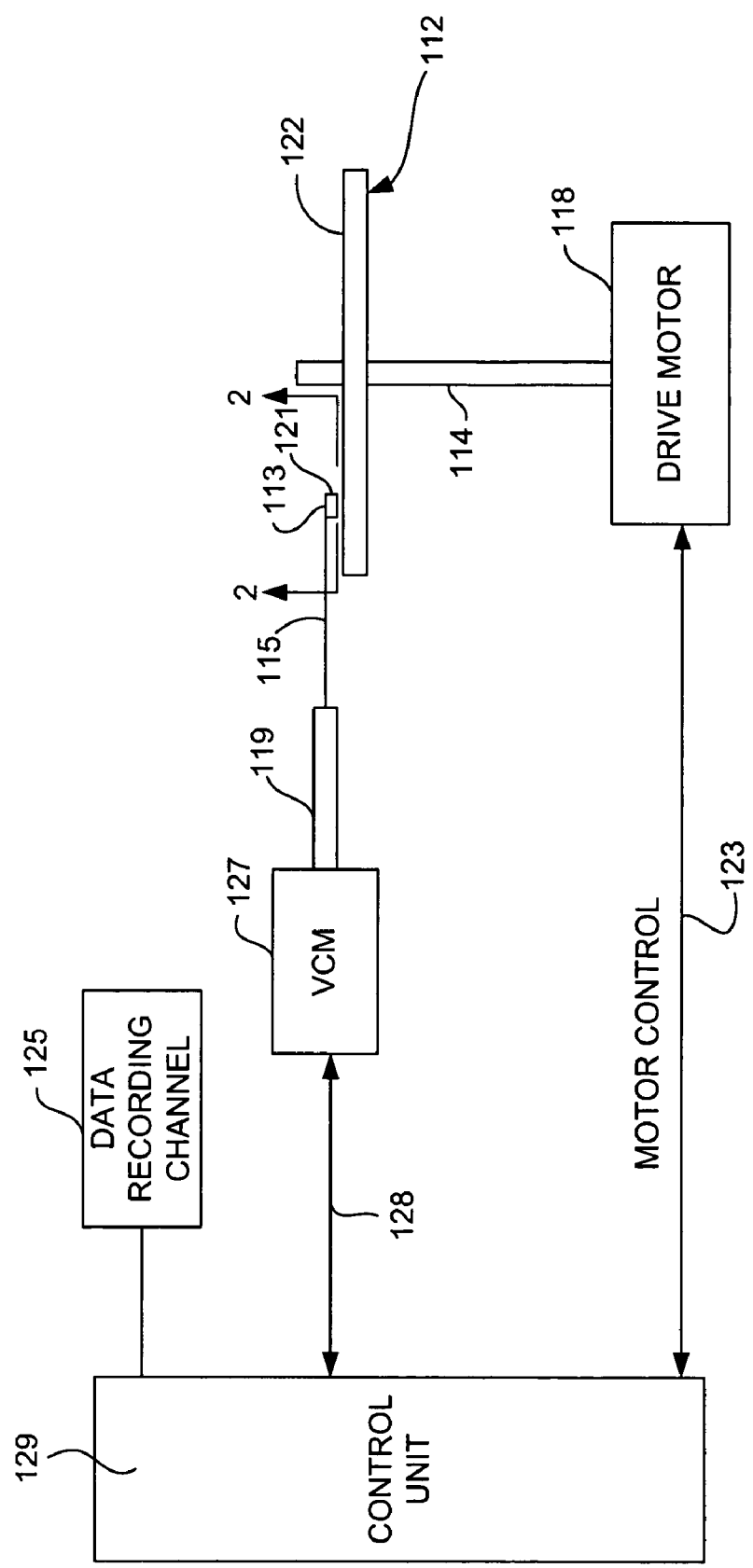
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
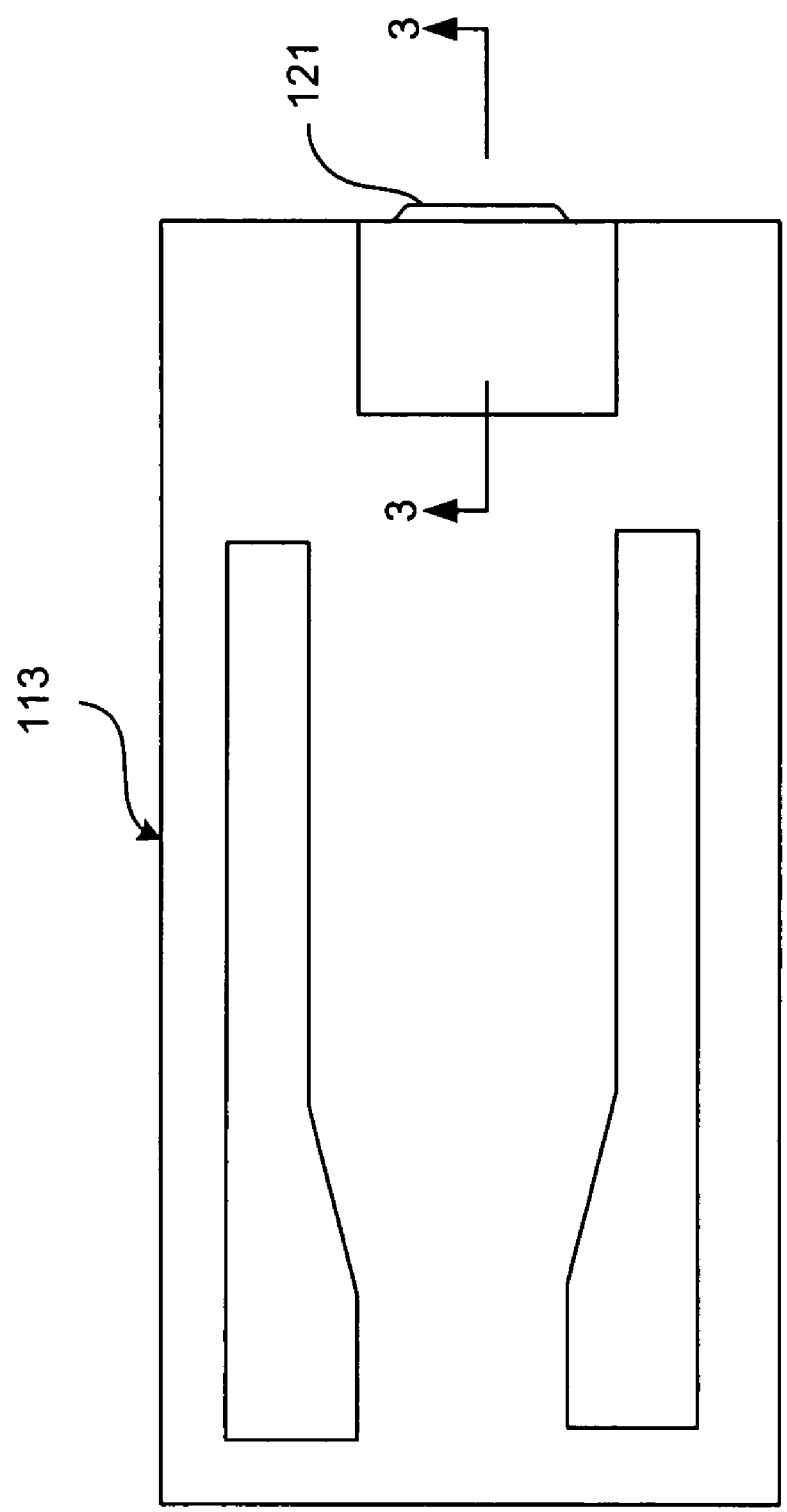
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
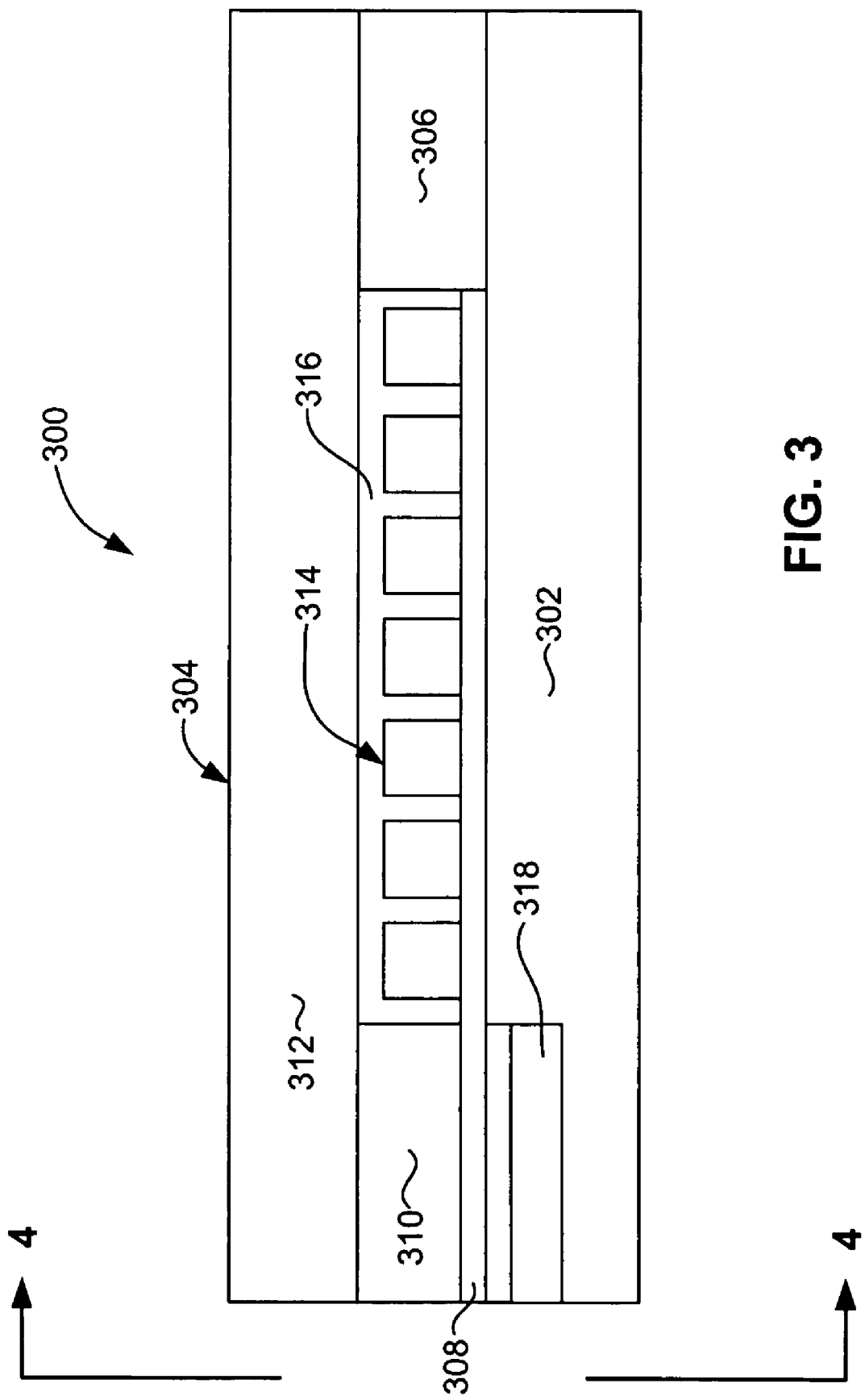
FIG. 3; is cross sectional view of a write head according to a possible embodiment of the invention.

With reference now to FIG. 3, a magnetic write head 300 according to an embodiment of the invention includes a first magnetic pole P1 302, and a second magnetic pole 304 formed over the first pole 302. The first and second magnetic poles are constructed of one or more magnetic materials such as CoFe or NiFe. The first and second magnetic poles 302, 304 are magnetically connected to one another by a back gap structure 306, which can also be constructed of a magnetic material such as NiFe or CoFe, and are separated from one another at a pole tip region by a, non-magnetic write gap material layer 308.

The second pole 304 includes a pedestal portion (P2) 310, and a portion (P3) 312 that extends from the P2 portion 310 to the back gap 306. The P2 portion 310 is preferably constructed of a high Bsat material such as $Ni_{50}Fe_{50}$ or CoFe. P3 312, and the back gap 306 can be constructed of CoFe or NiFe. A non-magnetic, electrically conductive write coil 314 passes between the first and second poles 302, 304. The coil 314 is constructed of a non-magnetic, electrically conductive material, such as Cu, and when a current flows through the coil a magnetic field from the coil causes a magnetic flux in the poles 302, 304, resulting in a fringing field (write field) across the write gap 308 at the pole tips. The coil 314 is embedded in one or more layers of insulation 316, which can be, for example, alumina ($Al_2O_3$).

Figure 4:
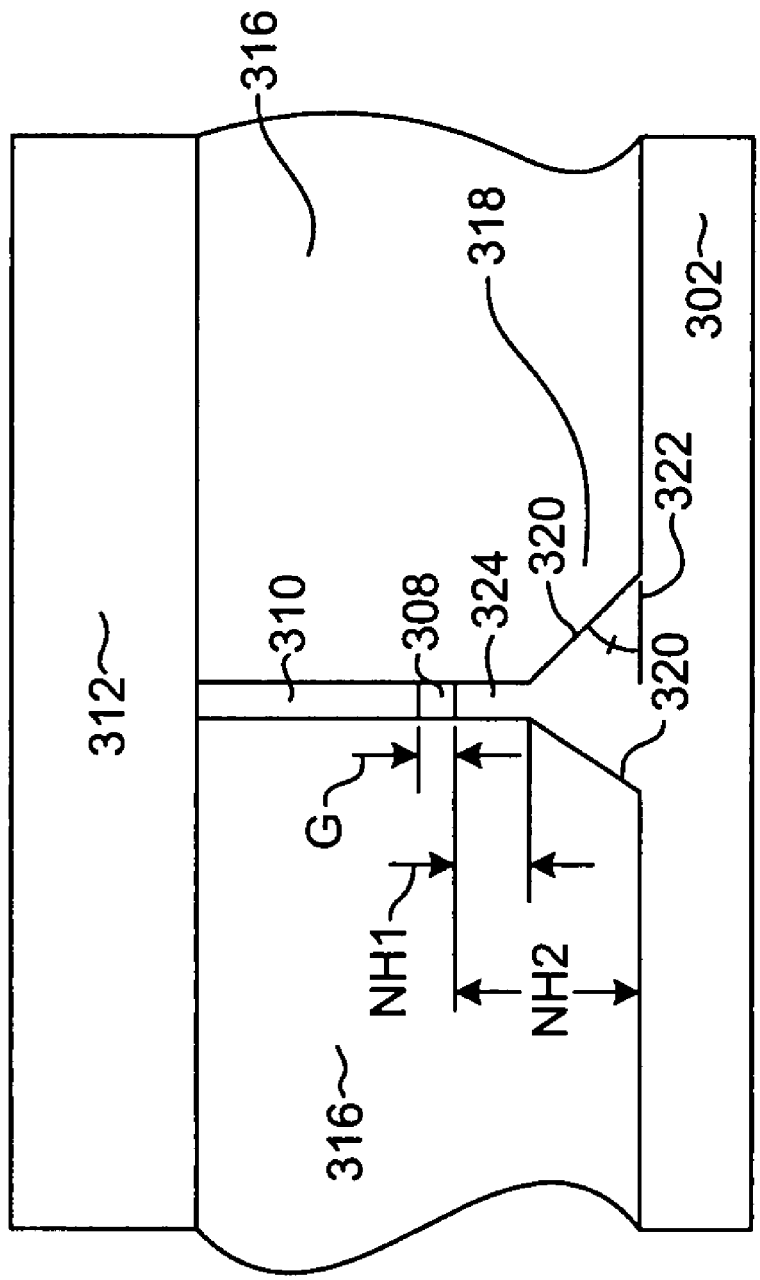
FIG. 4 is an ABS view, taken from line 4-4 of FIG. 3.

The first pole has a notched portion 318 which can be seen more clearly with reference to FIG. 4. As can be seen in FIG. 4, P2 310 is preferably very narrow. The notched portion 318 of the first pole has steep shoulders 320 that preferably have an angle 322 of 30-60 degrees with respect to a plane that is parallel with the layers making up the write head 300. The first pole preferably also has a narrow, vertical notched portion 324 that extends from the top of the steep shoulders 320 and that is self aligned with the P2 structure 310.

According to the present invention, the P2 structure 310 is preferably constructed very narrow to achieve a desired narrow track width. A manufacturing method that will be described herein below, makes this narrow track width possible while also achieving self alignment of the P2 structure 310 with the first notched portion 318 of the first pole 302. The self alignment of P2 310 with the notch 316 as provided by the present invention also ensures that the steep shoulder portions can be constructed to be symmetrical with one another.

The configuration of the notch 318 provides the head 300 with improved magnetic performance. The steep shoulder prevents flux from leaking to the sides and keeps the flux more tightly confined with the write gap 308. If the notch 318 were configured to have a shallow shoulder, such as the 2-10 degree shoulders of prior art heads, the flux extending between P2 310 and the shoulder of that head would be attracted to the shoulder and drawn outside of the region of the write gap 308. This would lead to adjacent track interference.

However, a certain amount of shoulder is desirable to help conduct flux to the narrow, vertical notched portion 324 to avoid magnetic saturation of the tip of the first pole 302 which would limit magnetic performance by reducing the available write field that the head 300 is capable of producing. Our analysis has shown that a shoulder angle 322 of 30-60 degrees provides an optimum balance for avoiding stray side field leakage or adjacent track writing, and avoiding flux choking at the pole tips.

With reference still to FIG. 3, the gap 308 has a gap thickness G as measured along a track length direction. The height of the narrow, vertical notch portion 324 has defines a first notch height NH1 that is measured from the gap 308 to the beginning of the steep shoulder portion 320. Preferably NH1 is 0.5 to 2 times the gap thickness G, or about equal to G. NH1 may also be about 1.5 times G. The distance from the gap 324 to the base of the steep shoulder portion 320 defines a second notch height NH2 (total notch height). NH2 can be 3-5 times G or about 4 times G.

The P2 structure (as well as the top notched portion of the P1 structure) can be constructed to have a very narrow track width of 0.5-5 times the gap thickness G, and more preferably 0.5-2 times the gap thickness G. This narrow track is made possible by a method of manufacture that will be described in greater detail herein below. The present invention also allows the P2 structure to be laterally self aligned with the notched portion 318 of the first pole 302, which allows the steep shoulders 320 of the first pole 302 to be perfectly symmetrical with respect to one another. This symmetry is critical to optimal writer performance.

Figure 5:
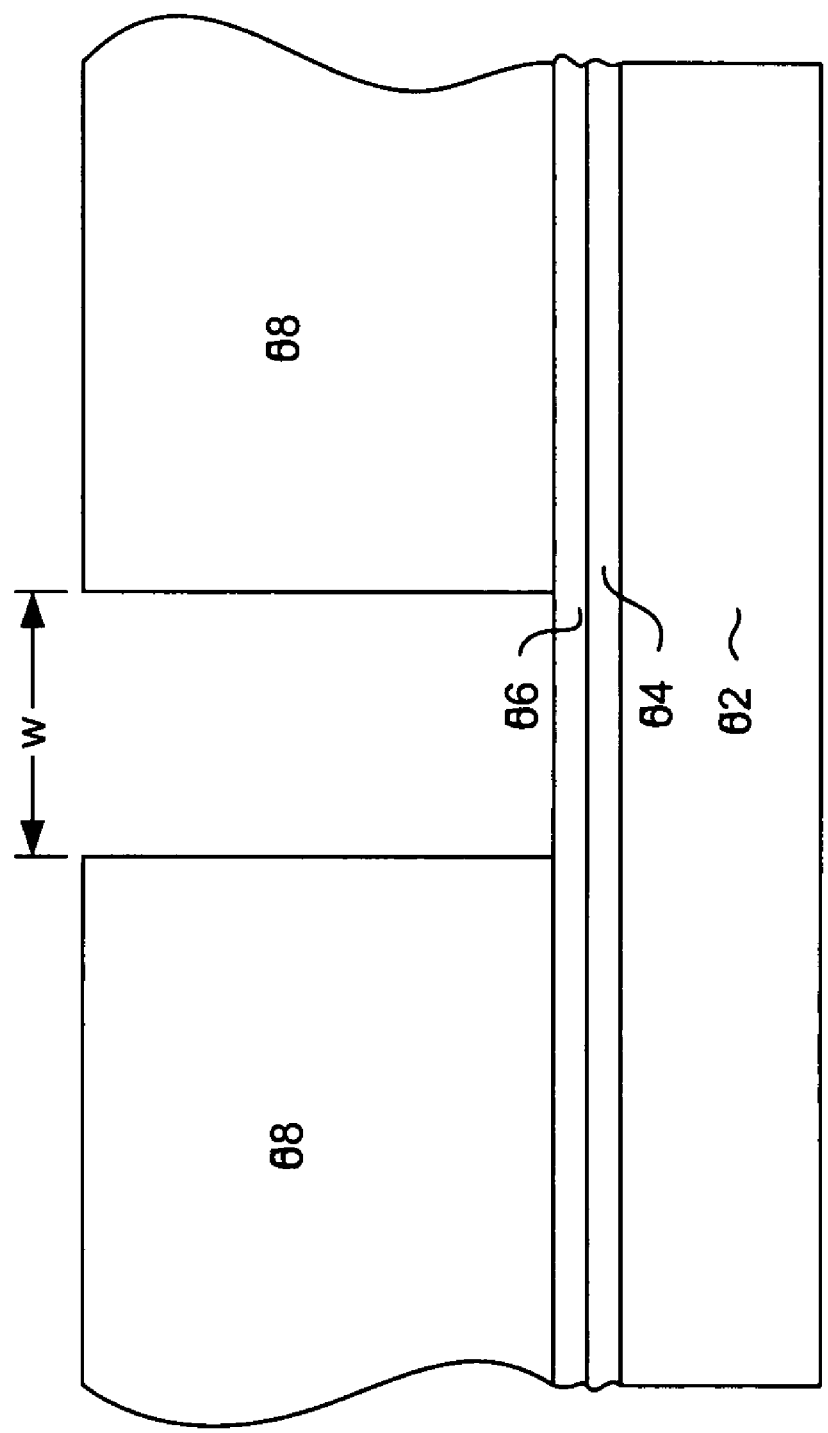
FIGS. 5-11 are views of a write head according to an embodiment of the invention, shown in various intermediate stages of manufacture.

FIGS. 5-11, illustrate a method for constructing a write element 302 according to an embodiment of the invention. With particular reference to FIG. 5, a first magnetic layer (first pole) 502 is formed. A non-magnetic write gap layer 504, such as alumina or some other suitable material is then deposited over the first pole 502. An optional seed layer 506 may be deposited over the write gap layer 504. The write gap layer may be an electrically conductive, non-magnetic metal (metal in gap design) in which case a seed layer 506 may not be necessary for subsequent plating.

After depositing the write gap material layer 504 and (if desired) the seed layer 506, a photoresist frame or mask 508 is formed. The mask 508 defines an opening having a width (W) that is substantially equal to the desired width of the steep shoulder portion 320 (FIG. 4) of the first pole 302 at its base or widest point in the finished write head.

Figure 6:
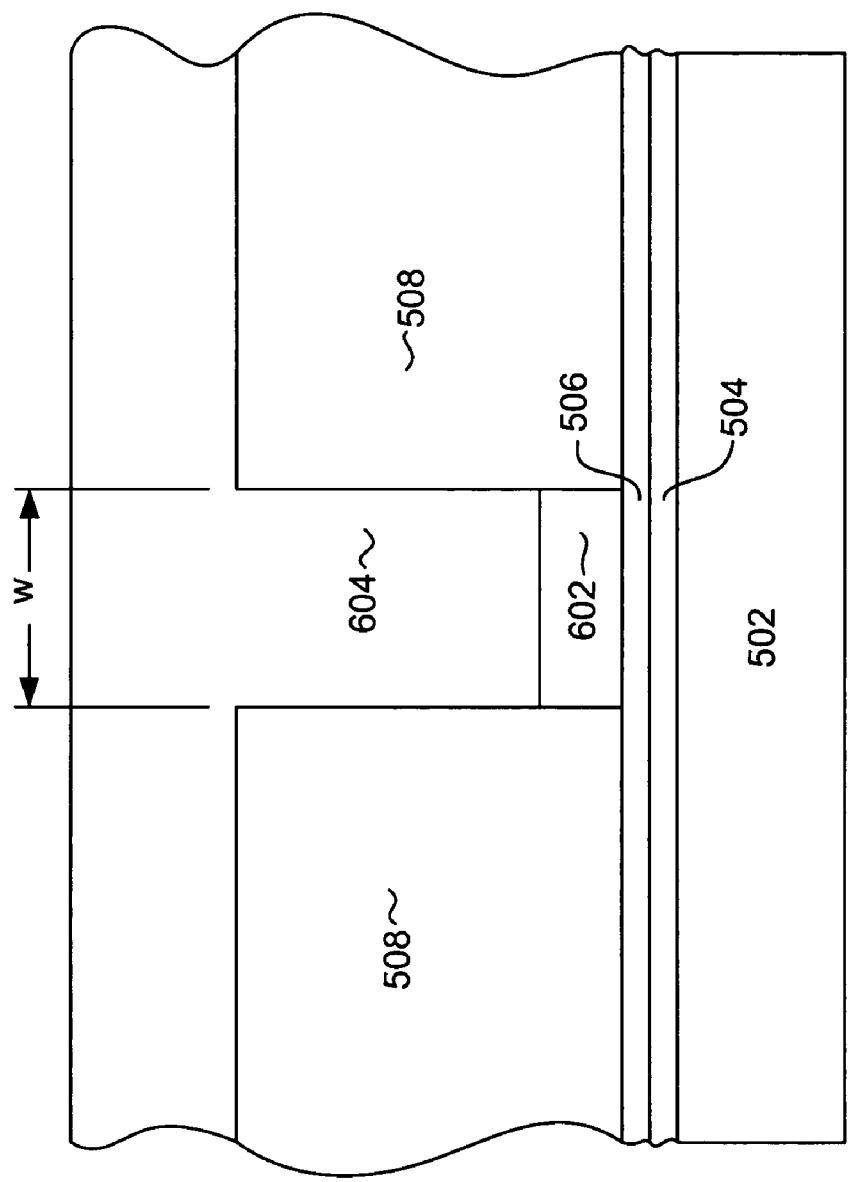

With reference to FIG. 6, a magnetic structure (P21) 602 (first portion of P2 310) is then deposited into the photoresist frame 508. The P21 portion 602 is preferably formed of a high magnetic saturation (high Bsat) material such as CoFe or $Ni_{50}Fe_{50}$, and can be deposited by electroplating. The P21 portion 602 has the same width W as the photoresist frame 508, and this width is significantly wider than the desired finished width of the P2 structure 310 (FIG. 3). After depositing the P21 magnetic structure 302, a layer of shrinkable material 604, such as SAFIER® is deposited. SAFIER is a liquid polymer solution, much like photoresist but without sensitizer. This shrinkable material 604 is preferably deposited to fill the opening in the photoresist frame 508 and to extend to a level above the top of the frame 508. If a liquid polymer material such as SAFIER is used, it can be spin deposited.

Figure 7:
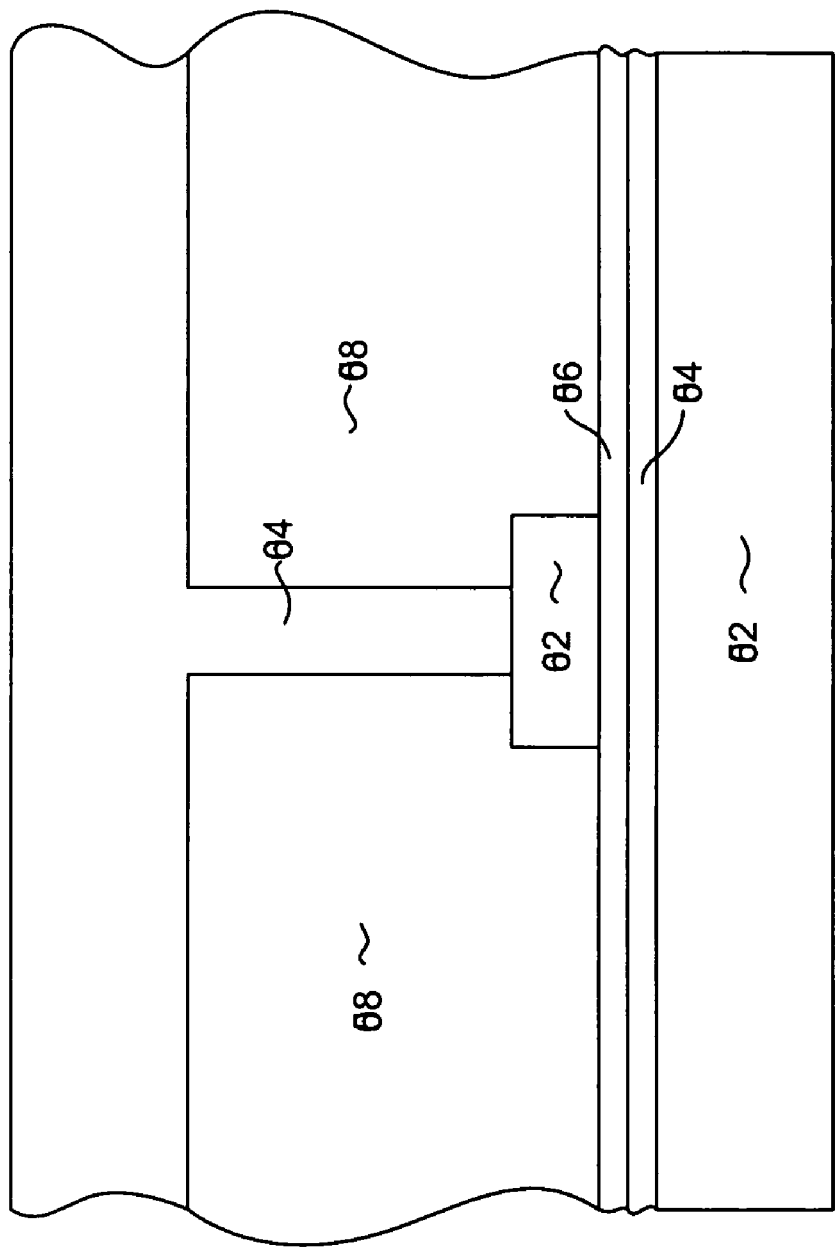

With reference now to FIG. 7, a baking process is performed to shrink the SAFIER or other shrinkable material 604. For example a wafer with the deposited structures can be baked at 100 to 200 degrees C. or about 120 degrees C., which can reduce width of the photoresist frame opening to a width W2 of, for example 0.2 um. As can be seen this shrinking process pulls the sides of the photoresist frame in from the ends of the P21 structure 602 by a distance that is perfectly symmetrical at both ends of the P21 structure 602. This feature is important in providing symmetrical steep shoulder structure as illustrated in FIG. 3.

Figure 8:
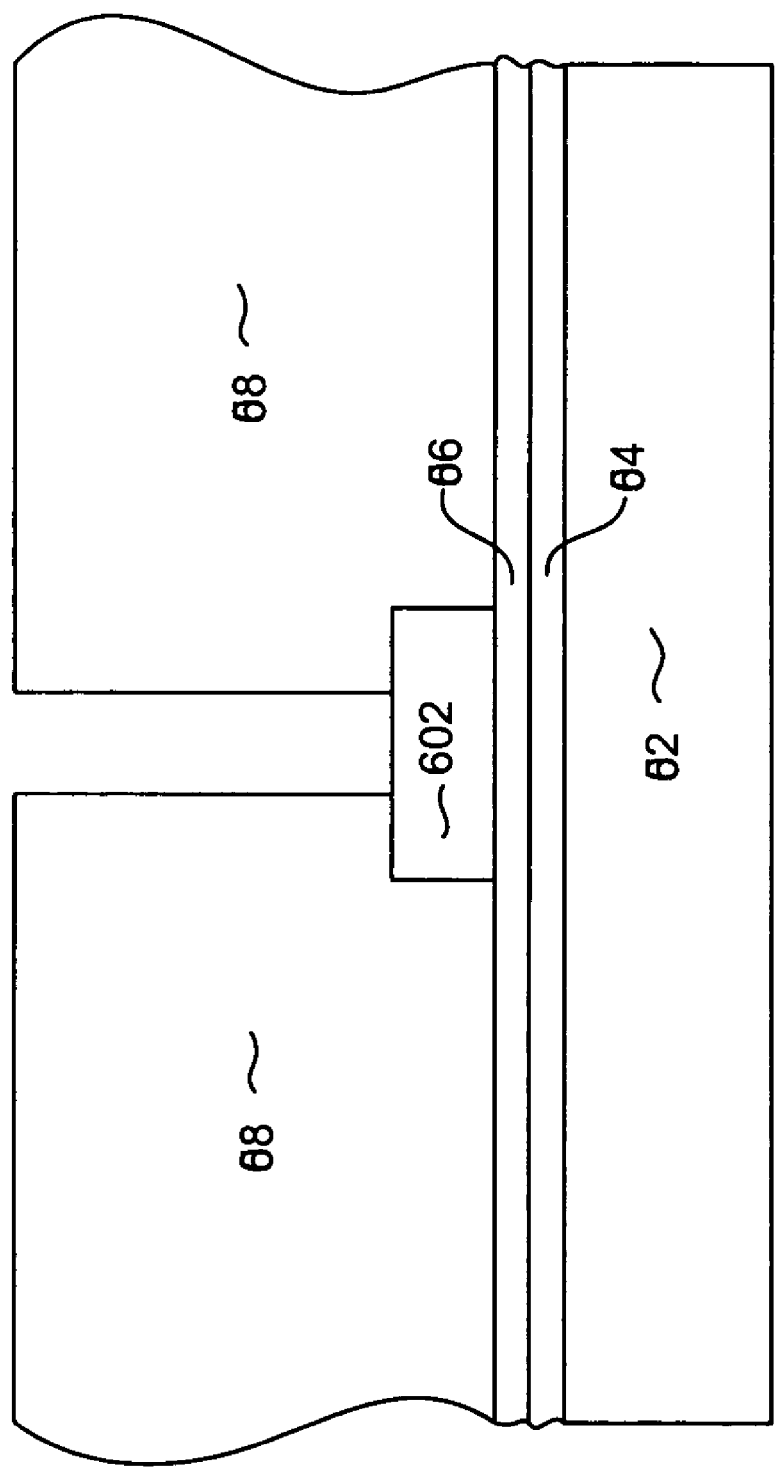
Figure 9:
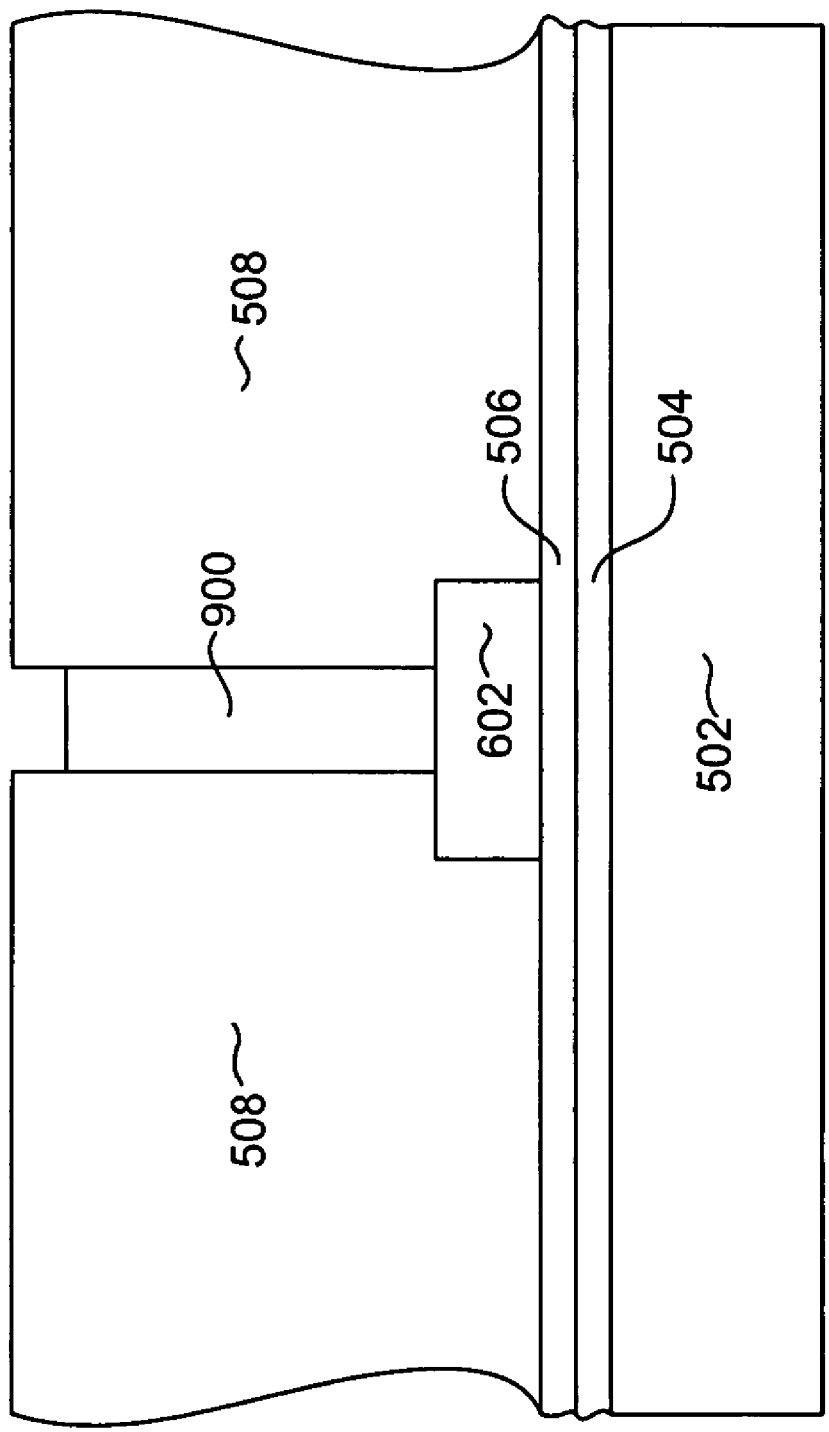
Figure 10:
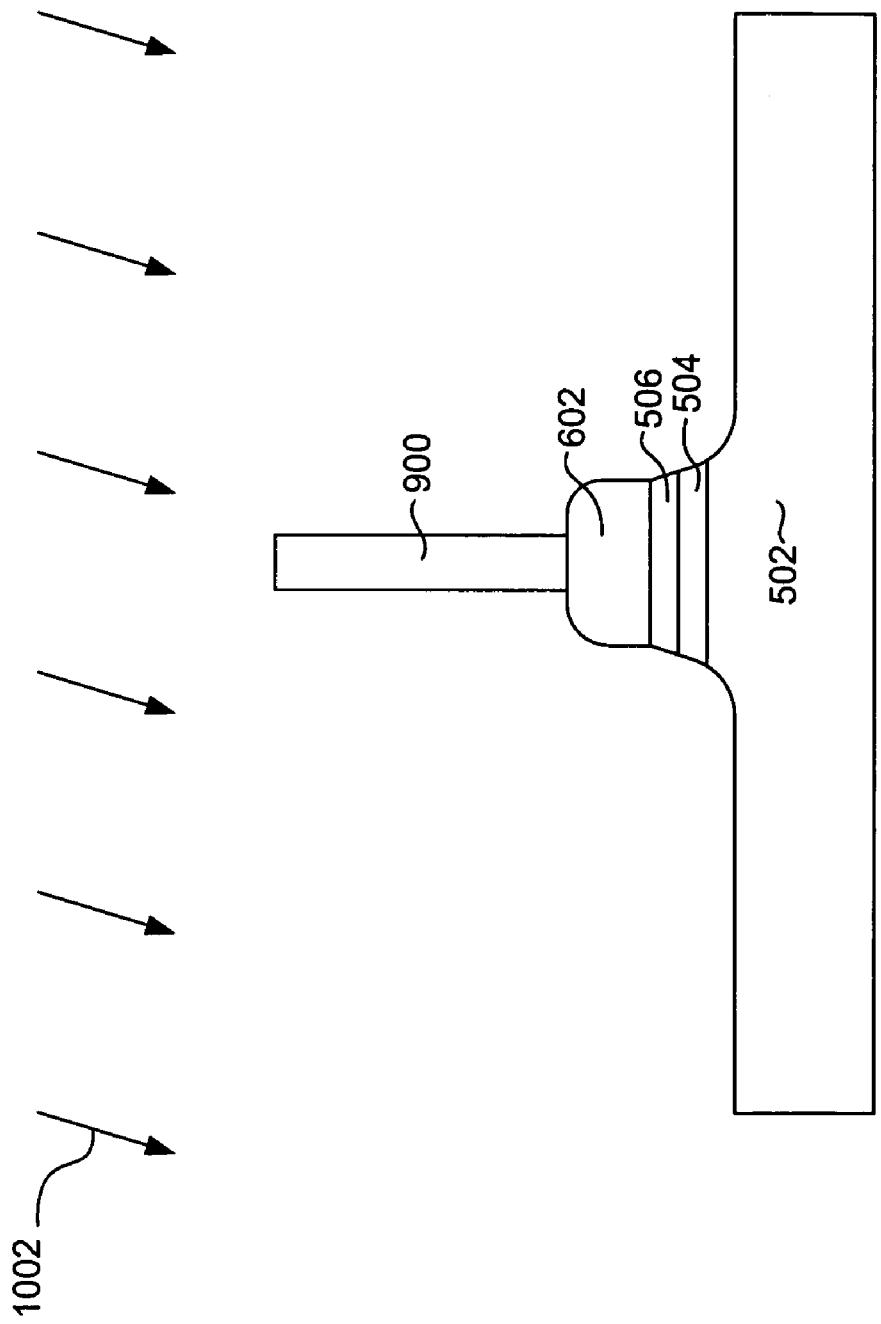

With reference now to FIG. 8, the SAFIER layer 604 is removed. This can be accomplished, for example, by dissolving the SAFIER layer 604 in water. With reference now to FIG. 9, the remaining portion of P2 900 can be deposited, such as by electroplating. The P2 structure 900 can be, for example CoFe, $Ni_{50}Fe_{50}$ or some other high saturation (high Bsat) material. Then, with P2 900 in place, the photoresist frame can be removed, and an ion mill 1002, as shown in FIG. 10 is performed. It is possible that some other material removal process could be used rather than ion milling, but ion milling is believed, at present, to be the best material removal process for this operation. The ion mill may 1002 can be performed at an angle, if desired, to control the amount of material removed from the sides of the P21 and P2 structures 602, 900 as well as the underlying structures 506, 504, 502.

Figure 11:
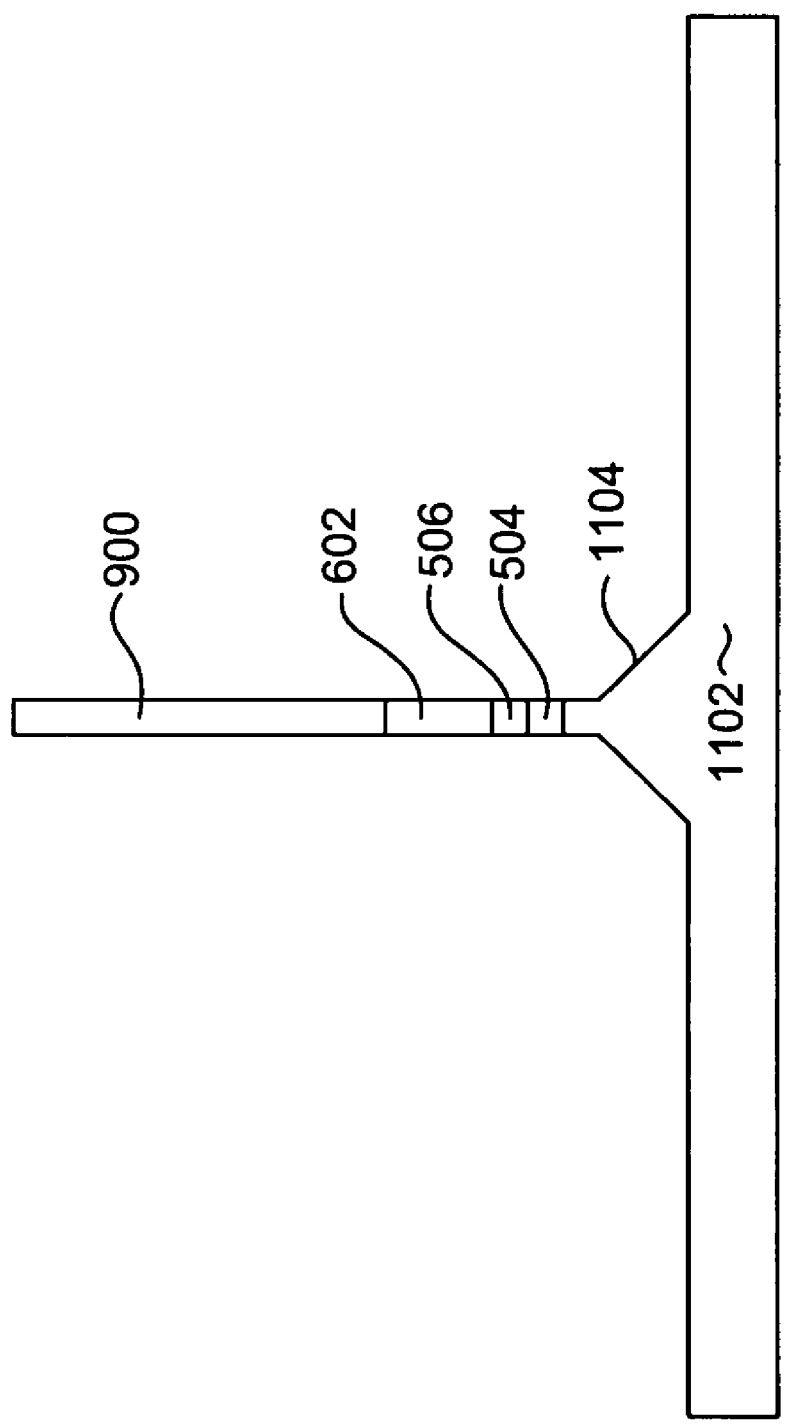

As can be seen with reference to FIG. 10, as the ion mill 1002 proceeds, the outer portions of the P21 structure 602 are progressively removed. In this sense, the P21 structure acts as a sacrificial mask, in that as the P21 structure 602 is removed (ie. the width of P21 602 decreases), more material previously protected by the P21 602 is exposed and removed by the ion mill 1002. As can be seen, the material at the outer edge of the P21 structure 602 is subjected to the ion mill 1002 for a longer time than material beneath P21 and located more inward, away from the ends of the P21 structure. The result is a first pole 502 having a steep shoulder structure 1104 as illustrated in FIG. 11.

We have found that this process results in a steep shoulder structure that has substantially linear walls. The angle of the shoulders 1103 can be controlled as desired by controlling the mill rate of the P21 structure. For example, increasing the thickness of the P21 structure increases the time required to remove the P21 material, and therefore, results in an increased slope (greater steepness) of the steep shoulder structure 1104. The ion mill 1002 can be performed sufficiently to produce a narrow notched portion 1106 that extends from the top of the steep shoulder portion 1104 and has a width that is substantially the same as the width of the P2 structure 900. As can also be seen, the angled ion mill 1002 results in a further narrowing of the P2 structure 900 as well as the notched portion 1106 of the P21 structure 602. This provides further improved narrow track width.

It should be pointed out that the above described manufacturing method, baking a shrinkable material such as SAFIER to reduce the width of the photoresist frame 508 prior to plating the P2 structure 900, provides several critical advantages. First, it provides a self aligned process for plating a narrow P2 structure onto a wider P21 structure. This combination of structures is needed to form the steep shoulder structure on the underlying first pole 502 as described. To achieve a symmetrical steep shoulder structure 1104, it is critical that the P2 structure 900 be perfectly centered on the P21 structure 602. If the P2 structure 900 is not perfectly centered on the P21 structure, then the resulting shoulder formed in the first pole will have a very asymmetrical shape, with one shoulder being very shallow, while the other shoulder is very steep. Such a structure would result in poor magnetic performance, because flux would be attracted to the side having the shallow shoulder causing side writing at that side. Without the above described process, it would be necessary to perfectly align a second photoresist mask to form the P2 structure 900 over the P21 structure 602. Perfect alignment of this second mask at such small scales is virtually impossible and, therefore, some misalignment and asymmetry would inevitably result. Even if perfect alignment were achieved at one location on the wafer, there would inevitably by misalignment at some other location on the wafer. The present invention completely avoids such alignment problems by using a single photoresist mask to form both the P21 structure 602 and then the P2 structure.

Another important advantage of the present invention is that it makes possible the construction of a very narrow, high aspect ratio P2 pole structure 900. The resolution of currently available photolithography techniques only allows the construction of a pole structure having limited width and aspect ratio. Increased resolution is available using E-beam lithography. However, this is very expensive and still only allows for the construction of pole having a limited track width. The present invention, while adding negligible additional cost, can produce a pole structure an extremely narrow track width With reference now to FIG. 12, in an alternate embodiment of the invention, a first pole 1202 has first and second laterally extending, flux attracting wing portions 1204 that extend from a notched portion 1206. The wing portions are preferably recessed from the ABS by a distance of about 0.5-10 times the gap thickness G. The formation of the wing portions 1202 are made possible by a bump 1208, which may be formed of alumina ($Al_2O_3$) or some other ion mill resistant material. The notch 1206 of the first pole 1202 can have steep shoulders 1210 and an upward extending narrow notch portion 1212 as described with reference to the previously discussed embodiment.

Figure 12:
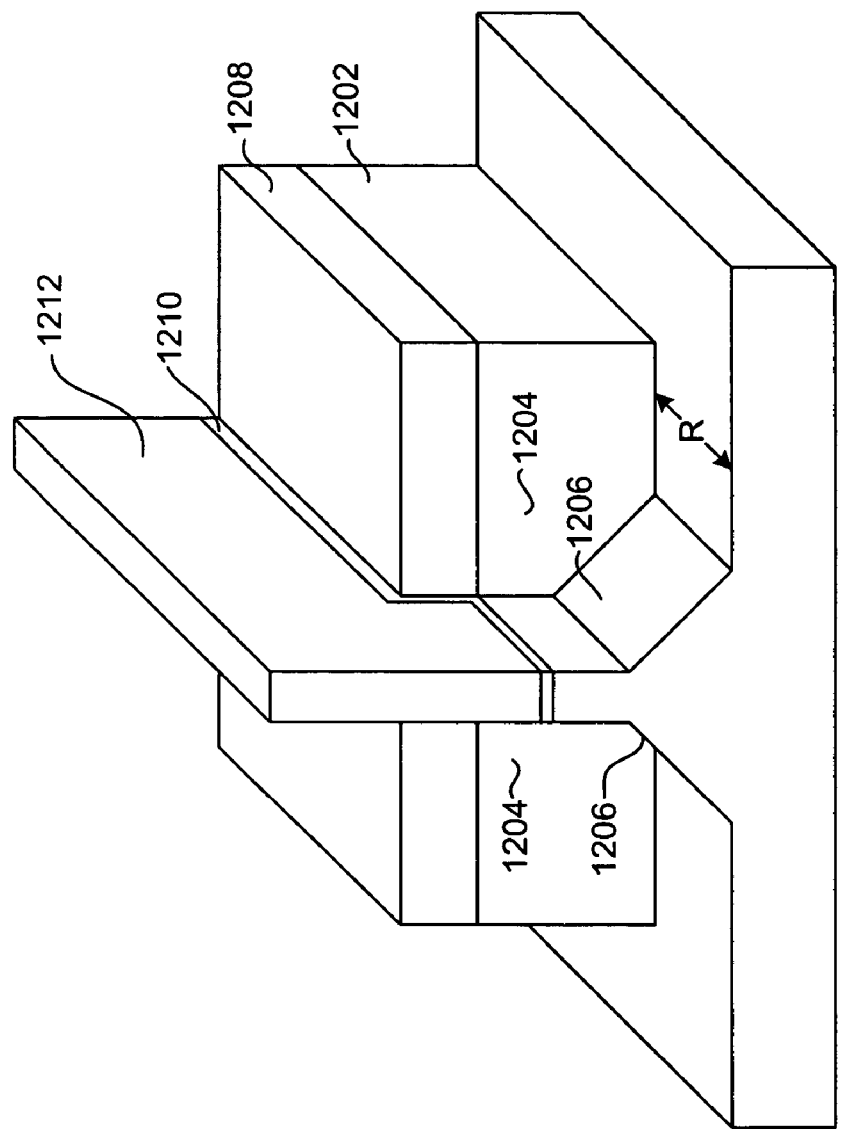
FIG. 12 is an isometric view of a write head according to an alternate embodiment of the invention.

As can be seen in FIG. 12, a write gap 1210 and P2 pole structure 1212 are formed over the first pole 1202. The write gap is constructed of a non-magnetic material, such as for example, alumina. The P2 structure 1212 can be constructed of a high Bsat material such as CoFe or NiFe and has a narrow width that can remain narrow over the alumina bump 1208.

The use of the bump 1208, makes it possible to construct the first pole 1202 to have the laterally extending wings, while the second pole structure 1212 can be constructed with a narrow width that extends beyond the location of the wings 1204. Our modeling has shown that this structure provides improved magnetic performance by minimizing side writing. As the magnetic write field extends across the write gap 1210 a certain amount of this field may extend out the sides as a side leaking field. The laterally extending wing portions 1204 draw this side leaking flux back away from the ABS and away from the adjacent magnetic medium, thereby preventing side writing.

The wing portions 1204 are preferably recessed from the ABS by a distance R of about 0.5-10 times the gap thickness G. Our modeling has shown that this configuration, with a first pole having wing portions and a second narrow pole that remains narrow past the location of the wings, provides optimal magnetic performance.

Figure 13:
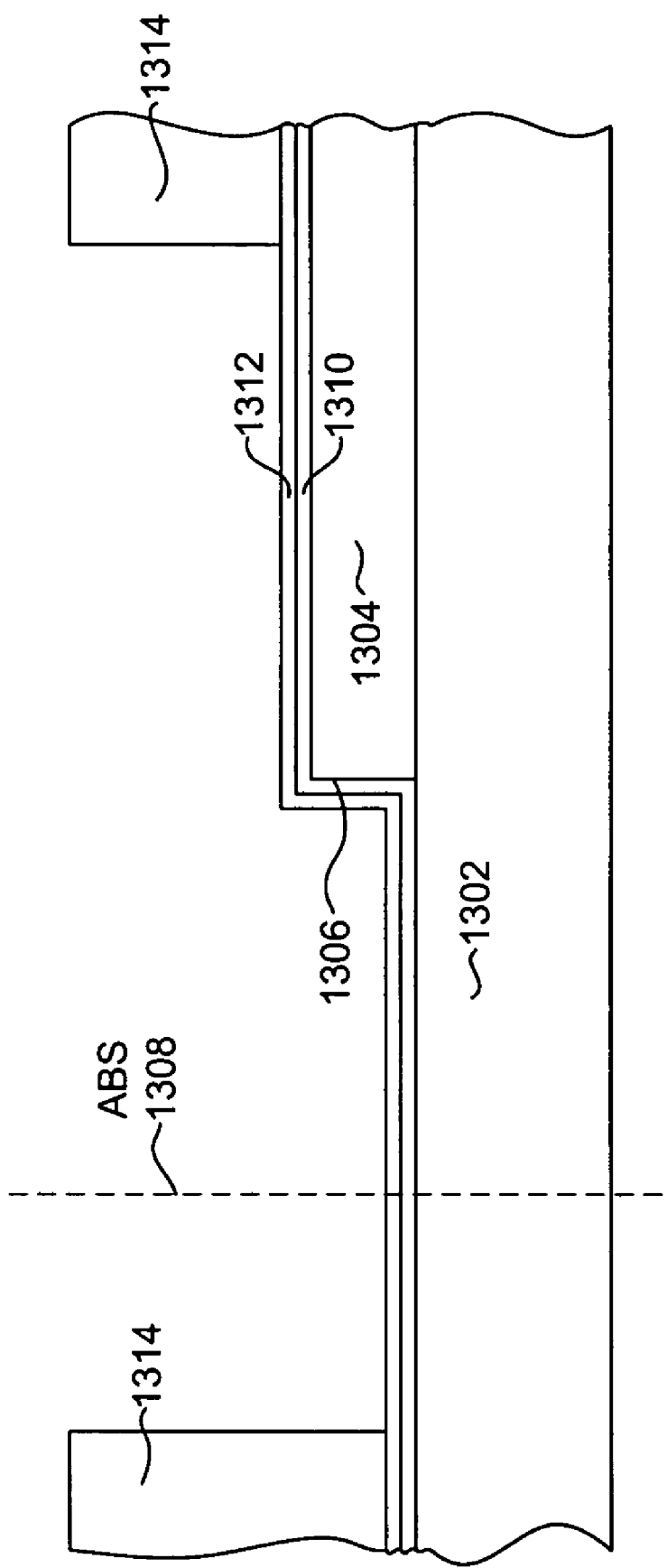
FIGS. 13-17B are views of a write head according to the alternate embodiment of the invention, shown in various intermediate stages of manufacture.

A method of manufacturing a write head according to the above discussed alternate embodiment of the invention is described in FIGS. 13 through 17. With reference now to FIG. 13, a first pole layer 1302 is formed, and can be constructed of, for example, CoFe or NiFe. An ion mill resistant structure 1304 is formed on the first pole 1302. Although the ion mill resistant structure could be constructed of several materials, it preferably is constructed of Alumina and will hereinafter be referred to as an alumina bump 1304. The alumina bump 1304 has a front edge 1306 that is preferably recessed from a desired air bearing surface (ABS) location 1308 by a distance of 1-15 times the gap thickness G. Although the ABS does not actually exist at this stage of manufacture, it will subsequently be formed by a lapping process, and the future location of the ABS is indicated by dashed line 1308.

Figure 14A:
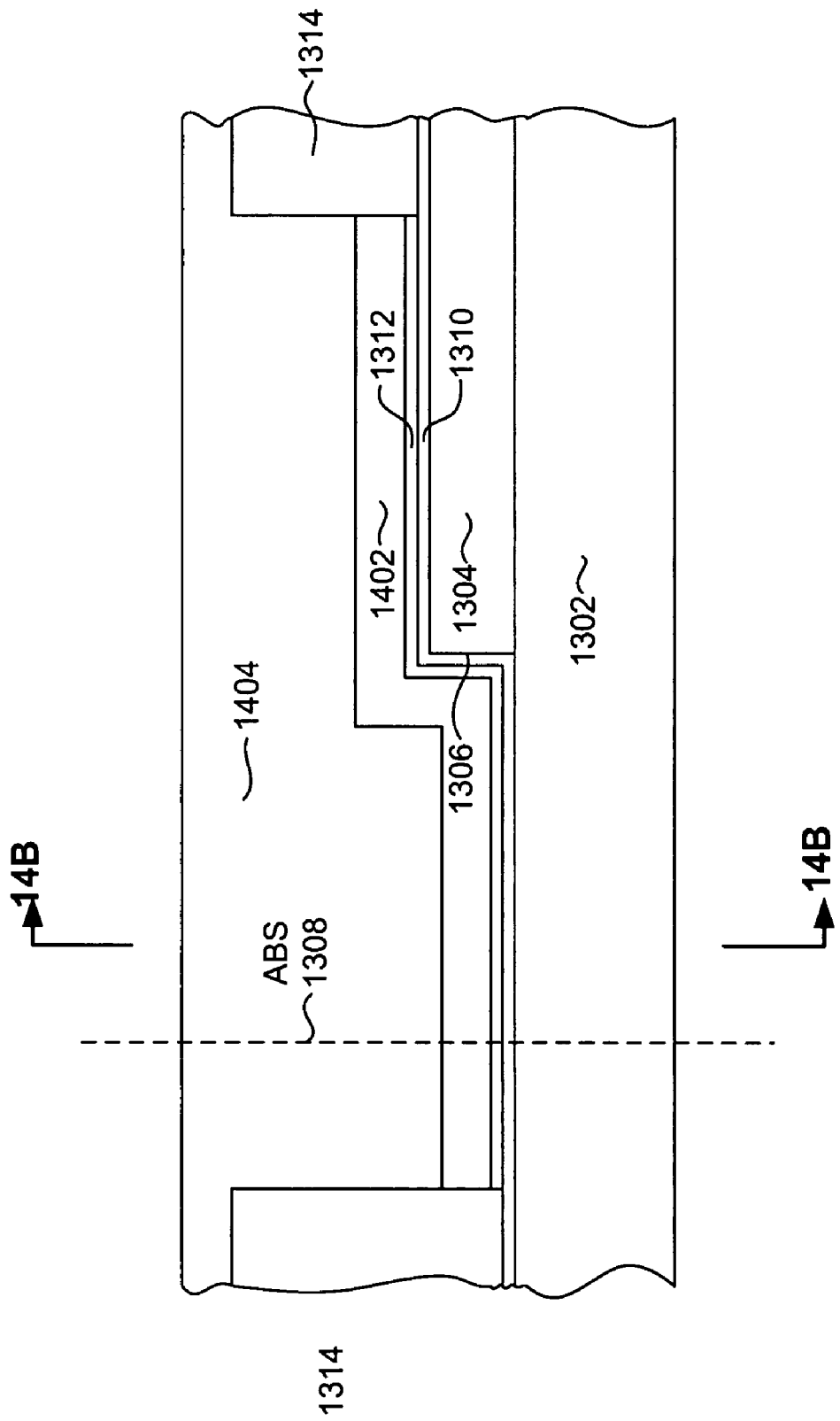
Figure 14B:
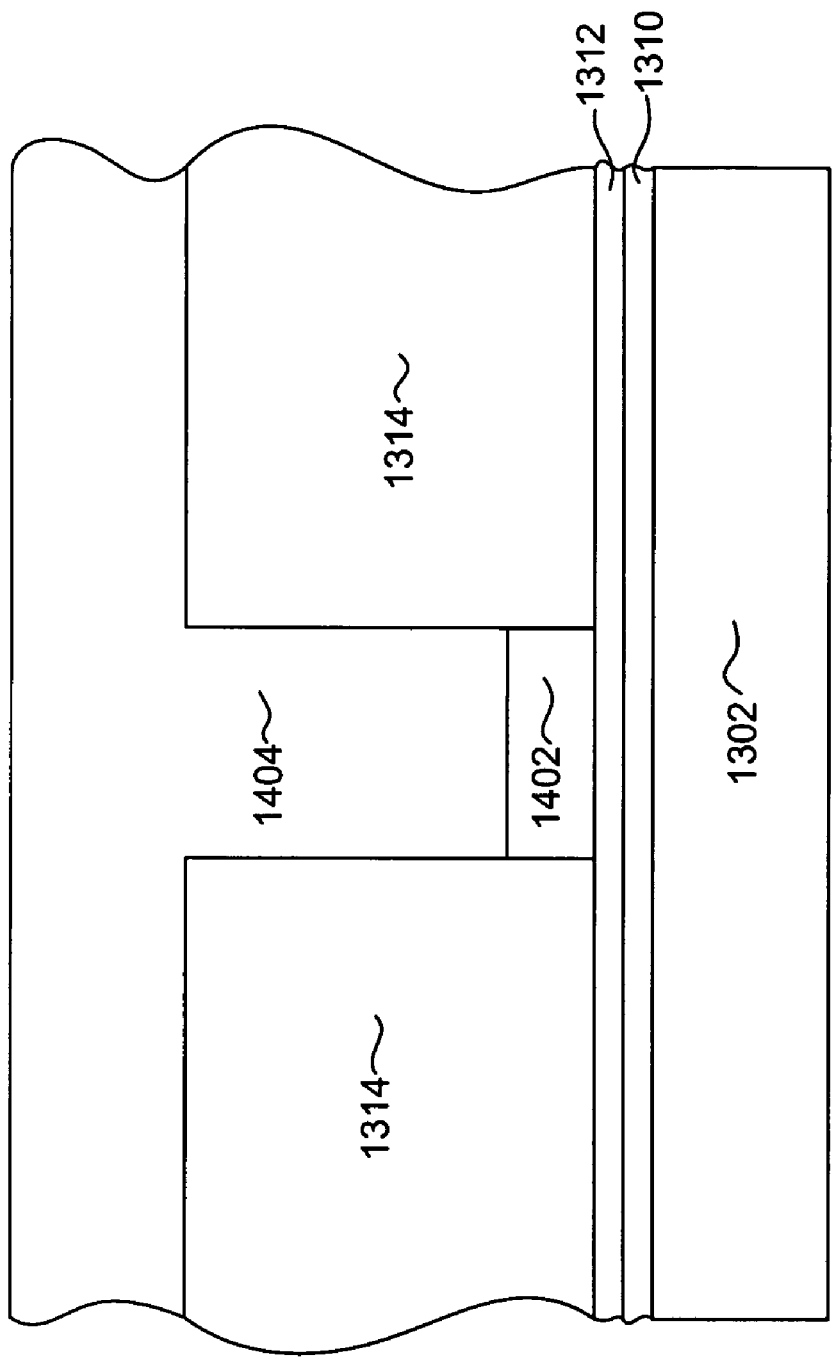

With continued reference to FIG. 13, a layer of non-magnetic write gap material 1310 is deposited over the first pole 1302 and the alumina bump 1304. An optional seed layer 1312 may be deposited over the write gap material layer 1310. A photoresist mask or frame 1314 is then formed. With reference to FIGS. 14A and 14B, a P21 structure 1402 is deposited into the photoresist frame. Then, a shrinkable material 1404 is deposited. As with the previously described embodiment, the P21 structure can be a high Bsat magnetic material such as CoFe or $Ni_{50}Fe_{50}$, and the shrinkable material can be, for example SAFIER or some similar material. With reference to FIG. 14B, it can be seen that a sectional view taken from line 14B-14B of FIG. 14A would look similar to the previously described embodiment illustrated in FIG. 6.

Figure 15A:
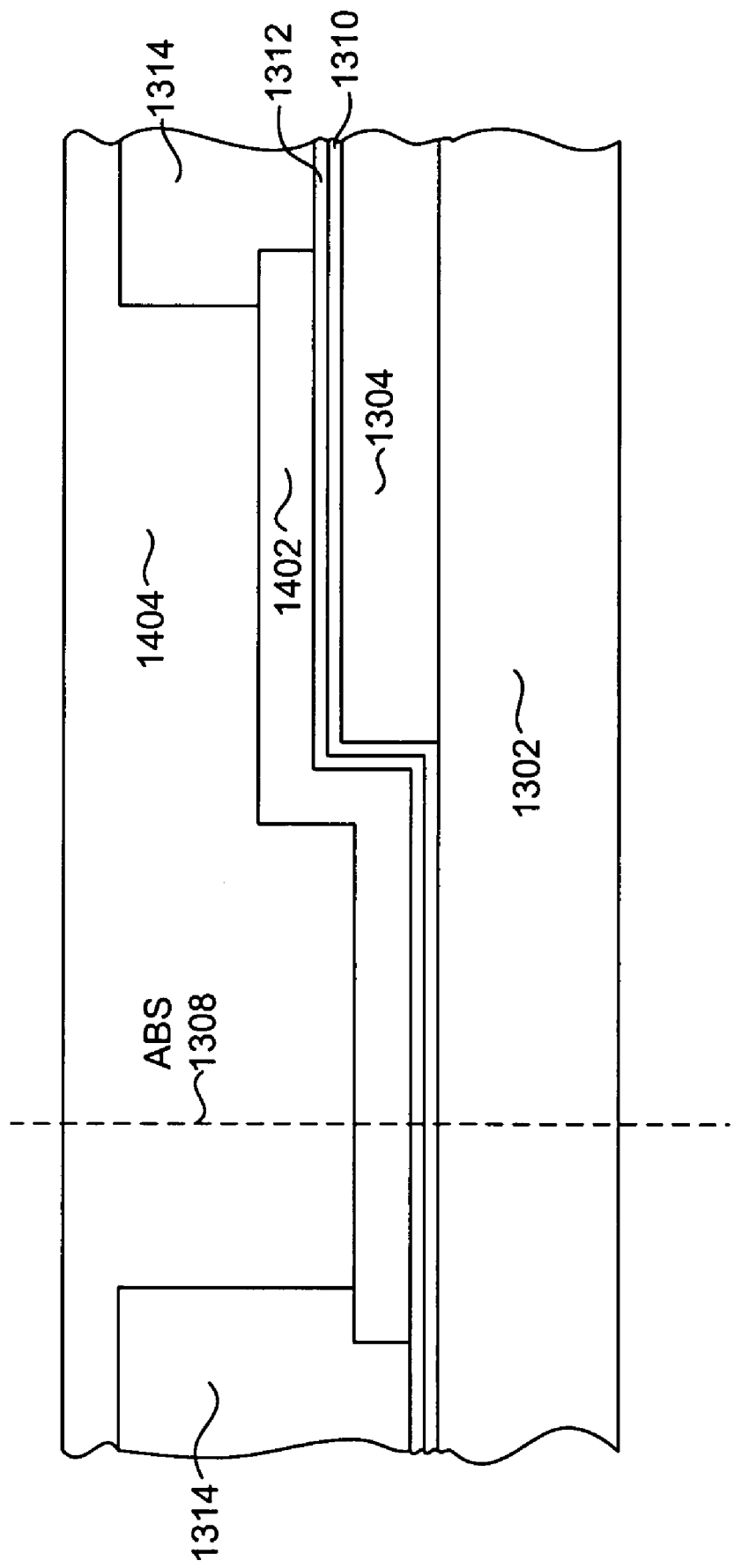
Figure 15B:
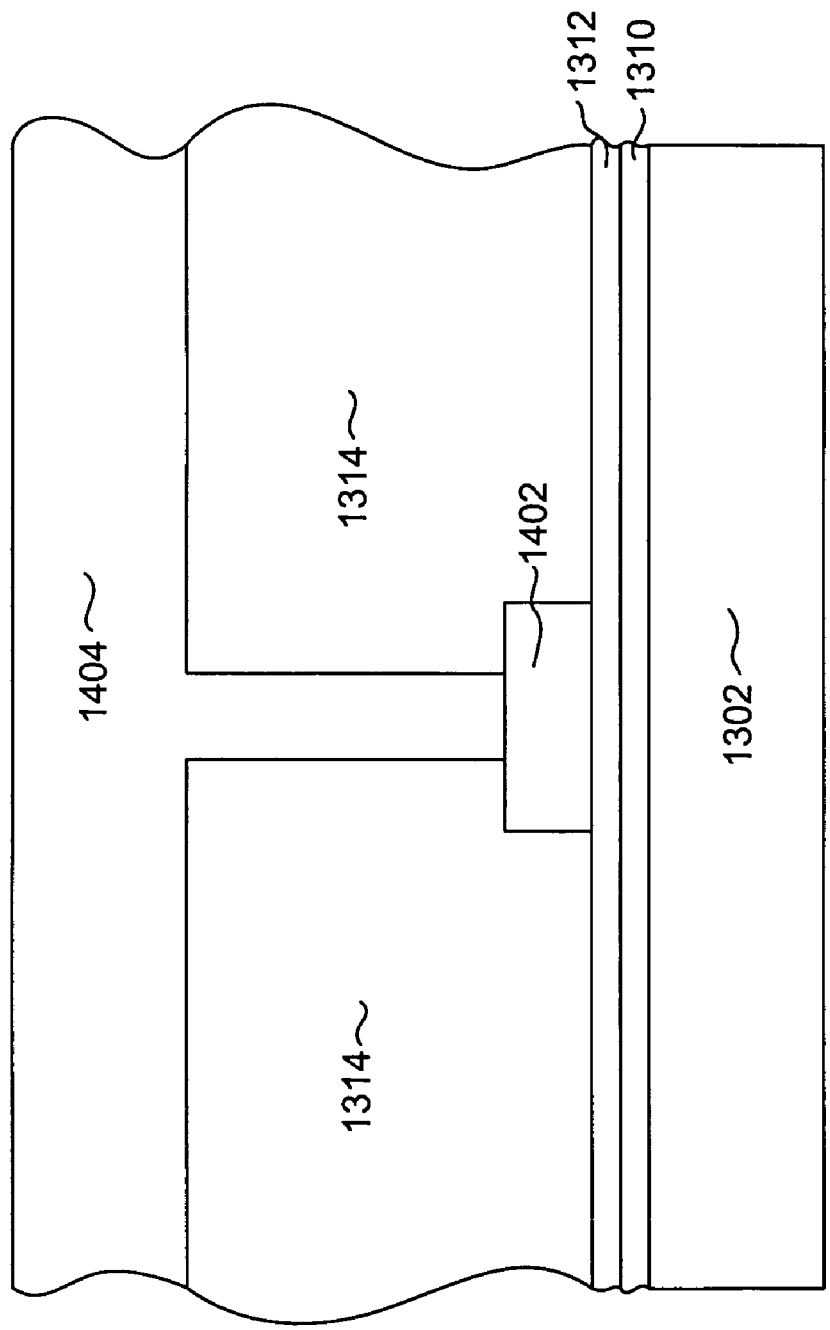
Figure 16A:
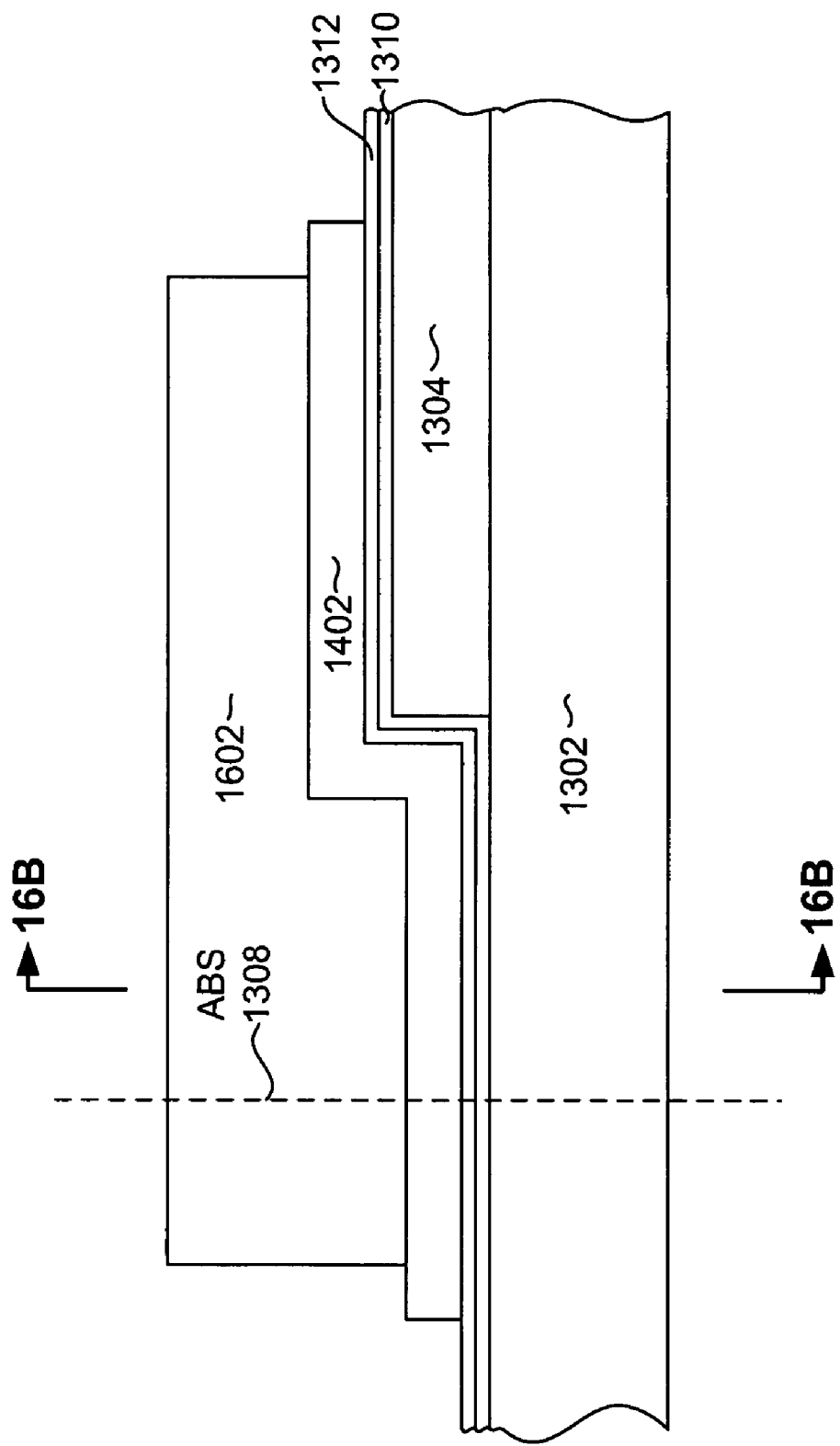
Figure 16B:
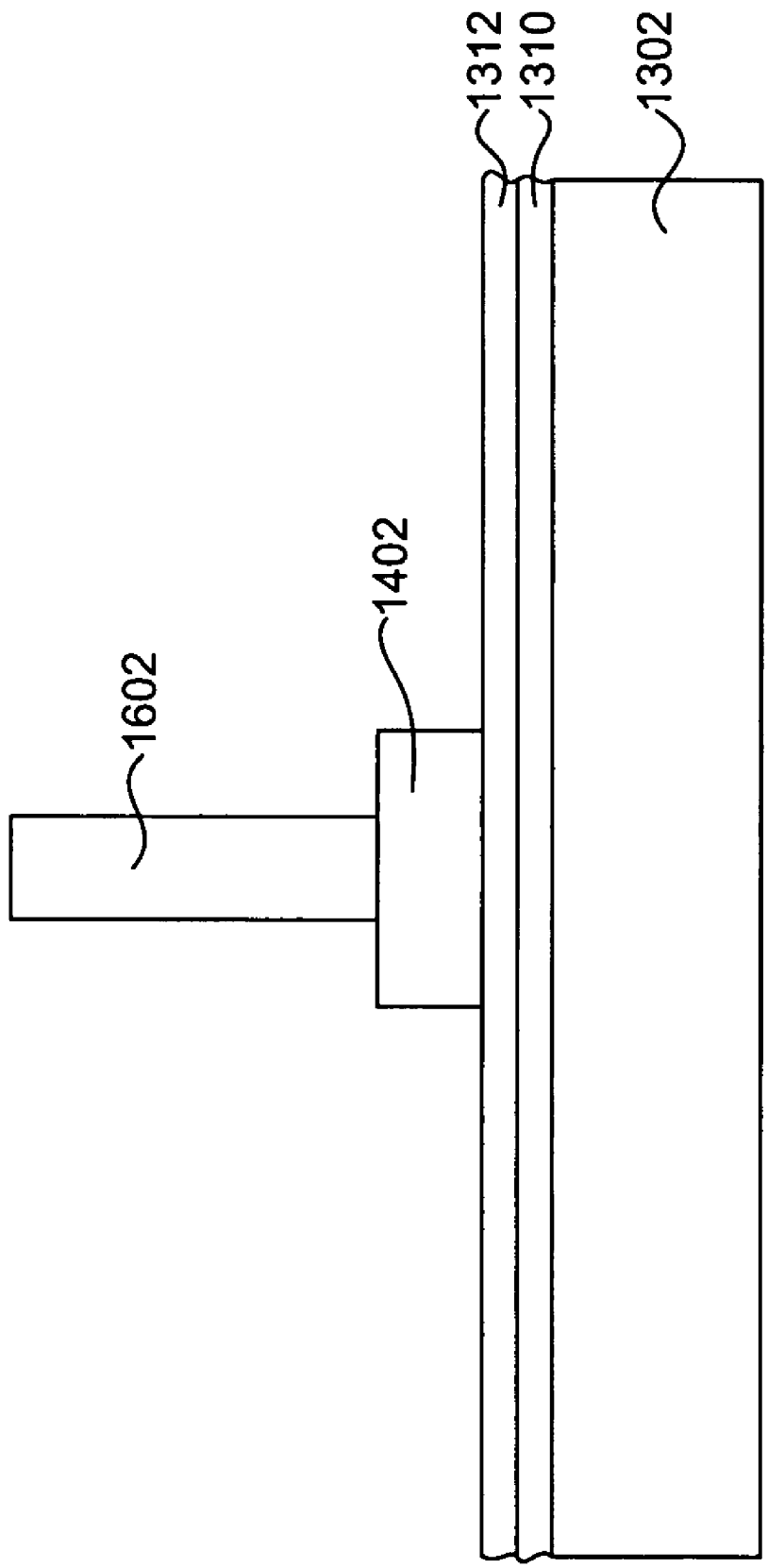
Figure 17A:
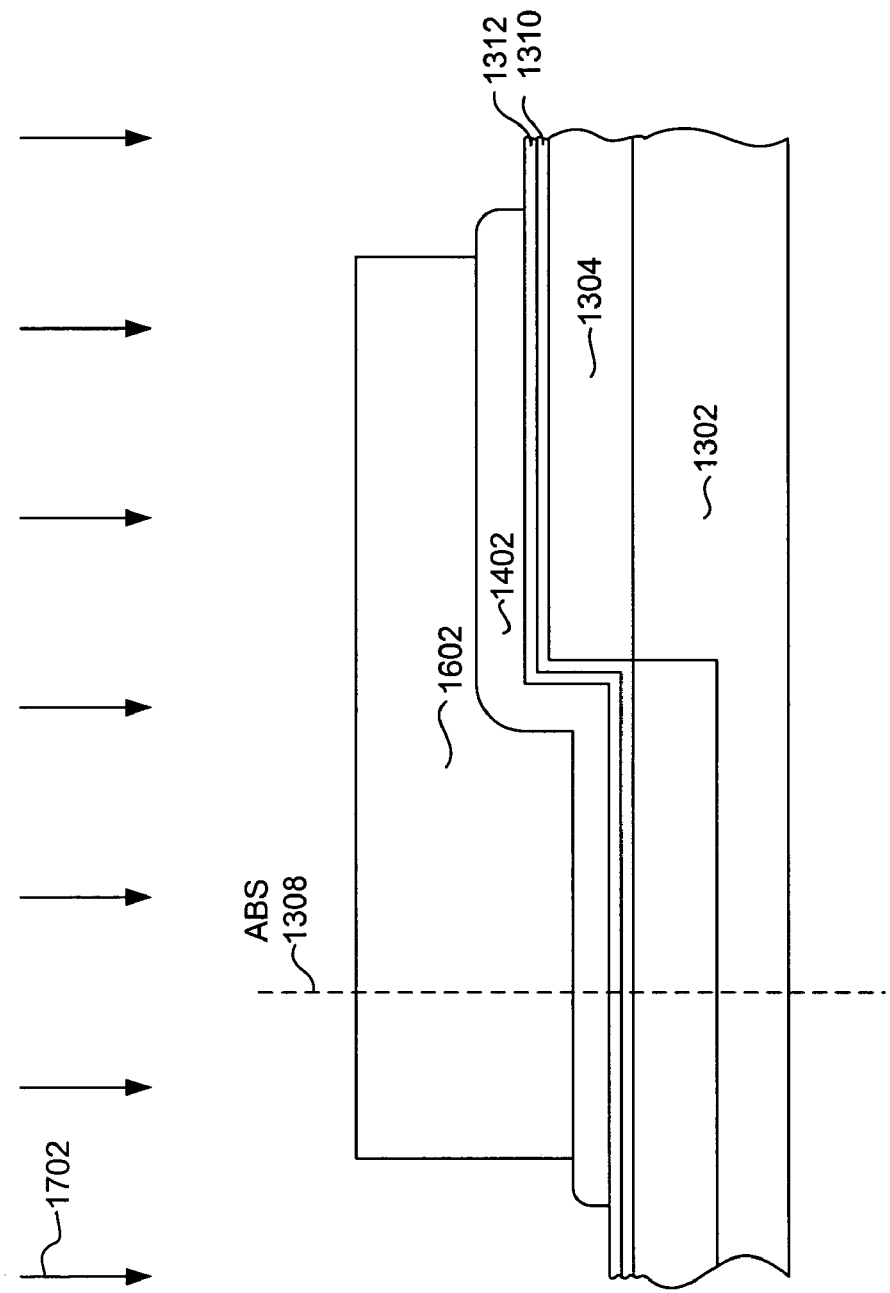
Figure 17B:
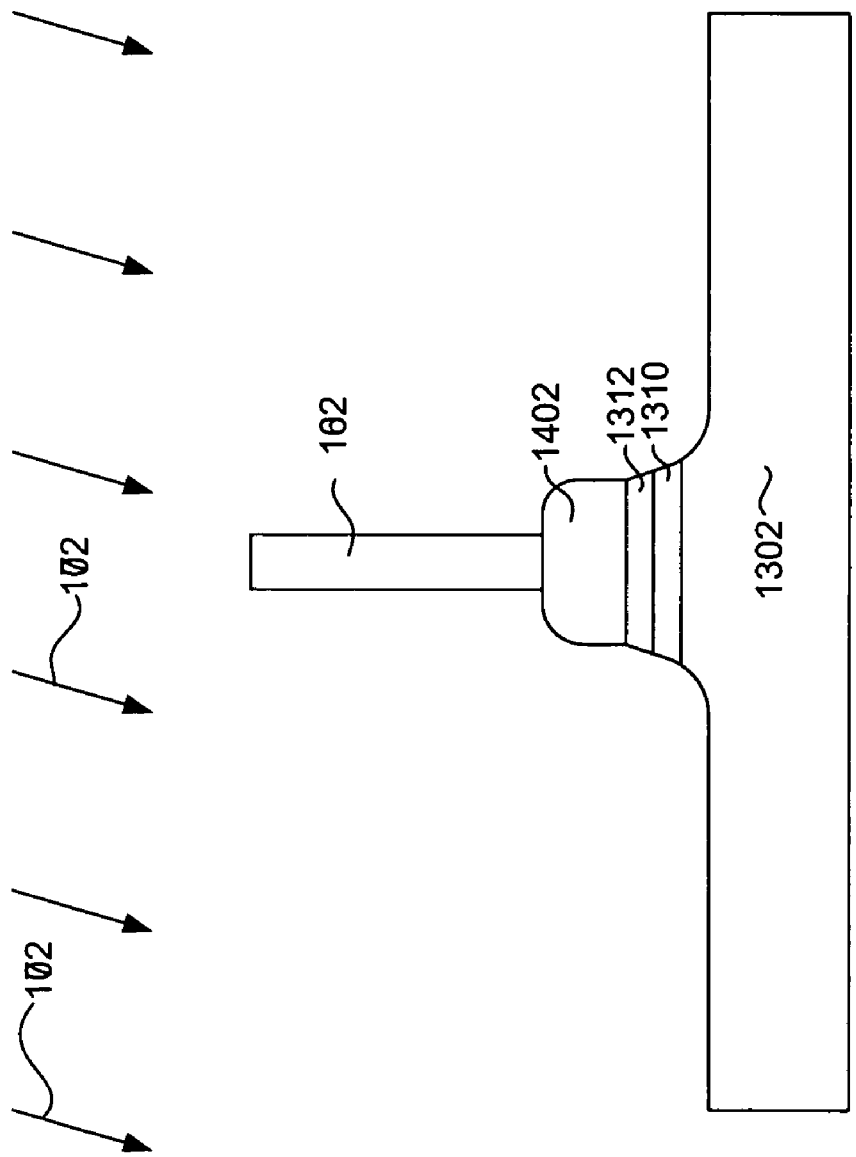

With reference now to FIGS. 15A and 15B, the structure formed thus far can be baked, preferably at a temperature of 100-200 degrees C. or about 120 degrees C. to shrink the shrinkable material 1404. Then, the shrinkable material 1404 can be removed, such as by dissolving in water. A P2 structure 1602 can be deposited, such as by electroplating CoPt or NiFe, and the photoresist frame can be lifted off resulting in a free standing P2 structure 1602 as shown in FIGS. 16A and 16B. An ion mill 1702 can be performed to remove material resulting in a structure as indicated in FIGS. 17A and 17B.

When the ion mill 1702 has been completed, the pole tip structure will have the configuration as shown in FIG. 12. The alumina bump 1208 prevents the ion mill 1702 from removing material from the first pole 1202 in the region beneath the alumina bump 1208. This results in the winged structure discussed above, which acts to stray, side flux away from the ABS, and back away from the medium. Our modeling has shown that this structure affords a significant improvement in write performance and reduction in side writing.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for use in magnetic data recording, the write head comprising:
   a first magnetic pole structure;
   a second magnetic pole structure (P2); and
   a non-magnetic write gap sandwiched between the first magnetic pole structure and the second magnetic pole structure (P2); and
   wherein the first magnetic pole structure includes first and second steep shoulders, and a narrow vertical notch portion extending from the top of the first and second steep shoulders;
   wherein the write head has an air bearing surface ABS, the write head further comprising laterally extending wing portions formed in the first pole structure, the laterally extending wing portions being recessed from the ABS; and
   further comprising an ion mill resistant bump formed over the first pole structure in the region of the laterally extending wing portions.

2. A write head as in claim 1 wherein the steep shoulders each form an angle of 30-60 degrees with respect to a plane parallel with the planes of the layers making up the write head.

3. A write head as in claim 1 wherein the write gap has a thickness and the narrow vertical notch portion of the first pole extends from the shoulders to the write gap a distance that is 0.5 to 2 times the gap thickness.

4. A write head as in claim 1 wherein the write gap has a thickness and the narrow vertical notch portion of the first pole extends from the shoulders to the write gap a distance that is about 1.5 times the gap thickness.

5. A write head as in claim 1 wherein the write gap has a thickness and the narrow vertical notch portion of the first pole extends from the shoulders to the write gap a distance that is about equal to the gap thickness.

6. A write head as in claim 1, wherein:
   the steep shoulders terminate at base;
   the write gap has a thickness G; and
   the steep shoulders and narrow vertical notch portion together define a total notch height measured from the write gap to the base of the steep shoulders, the total notch height being 4 to 6 times G.

7. A write head as in claim 1, wherein:
   the steep shoulders terminate at a base;
   the write gap has a thickness;
   the gap has a thickness G; and
   the steep shoulders and narrow vertical notch portion together define a total notch height measured from the write gap to the base of the steep shoulders, the total notch height being about 5 times G.

8. A write head as in claim 1, wherein the narrow vertical notch portion is laterally aligned with the second pole portion P2.

9. A write head as in claim 1 wherein the narrow vertical notch portion and the second pole P2 has each have a laterally measured width no greater than 0.5-5 times the gap thickness G.

10. A write head as in claim 1 wherein the laterally extending wing portions are recessed from the ABS by a distance of 0.5-10 times the gap thickness G.

11. A write head as in claim 1 wherein the ion mill resistant bump comprises alumina.

* * * * *